United States Patent
Apostolakos et al.

(10) Patent No.: US 9,281,890 B2
(45) Date of Patent: Mar. 8, 2016

(54) SYSTEM AND METHOD FOR CONVEYING AERONAUTICAL RADIO VOICE AND SIGNALING OVER A SATELLITE IP NETWORK

(71) Applicant: inAccess Networks S.A., Athens (GR)

(72) Inventors: Spyridon Apostolakos, Athens (GR); Konstantinos Simaiakis, Athens (GR)

(73) Assignee: INACCESS NETWORKS S.A., Athens (GR)

( * ) Notice: Subject to any disclaimer, the term of this patent is extended or adjusted under 35 U.S.C. 154(b) by 250 days.

(21) Appl. No.: 13/840,025

(22) Filed: Mar. 15, 2013

(65) Prior Publication Data

US 2015/0180567 A1   Jun. 25, 2015

(51) Int. Cl.
*H04W 4/00* (2009.01)
*H04B 7/185* (2006.01)
*H04W 4/10* (2009.01)
*H04L 29/06* (2006.01)

(52) U.S. Cl.
CPC ........ *H04B 7/18508* (2013.01); *H04L 65/1026* (2013.01); *H04L 65/1069* (2013.01); *H04L 65/4061* (2013.01); *H04W 4/10* (2013.01)

(58) Field of Classification Search
CPC ................................ H04Q 7/20; H04B 7/185
USPC ................ 370/316, 328, 338, 260, 261, 262; 455/519, 518, 413, 416, 567
See application file for complete search history.

(56) References Cited

U.S. PATENT DOCUMENTS

| | | | |
|---|---|---|---|
| 7,221,290 B2 * | 5/2007 | Burgemeister ................. | 340/945 |
| 7,245,940 B2 * | 7/2007 | Serbin et al. ................... | 455/563 |
| 7,783,315 B2 * | 8/2010 | Iyer ......................... | H04W 4/10 379/67.1 |
| 2004/0121729 A1 * | 6/2004 | Herndon et al. ............. | 455/12.1 |
| 2004/0192200 A1 * | 9/2004 | Karabinis et al. ............ | 455/12.1 |
| 2005/0143056 A1 * | 6/2005 | Iyer ..................... | H04W 76/005 455/416 |
| 2006/0063553 A1 * | 3/2006 | Iyer ..................... | H04W 76/005 455/519 |
| 2007/0186251 A1 * | 8/2007 | Horowitz et al. .............. | 725/63 |
| 2010/0087201 A1 * | 4/2010 | Choi et al. .................... | 455/450 |

* cited by examiner

*Primary Examiner* — Chuong T Ho
(74) *Attorney, Agent, or Firm* — Nixon Peabody LLP; Khaled Shami

(57) ABSTRACT

Systems and methods for conveying aeronautical radio voice and signaling over a satellite IP network are described. According to disclosed embodiments, a remote very high frequency (VHF) transceiver is connected with a central location where Air Traffic Control is exercised. The system implements an end-to-end path employing satellite communications to transmit radio voice and signaling. A method is also provided that enables radio call setup and voice transport so as to allow aircraft pilots and flight controllers to communicate.

6 Claims, 10 Drawing Sheets

SYSTEM AND METHOD FOR CONVEYING AERONAUTICAL RADIO VOICE AND SIGNALING OVER A SATELLITE IP NETWORK

FIELD

The present disclosure relates generally to aeronautical communications, and more particularly, to systems and methods for conveying aeronautical radio voice and signaling over a satellite IP network.

BACKGROUND

Air Traffic Control (ATC) functions to control flights in a controlled airspace, i.e., an airspace that is continuously controlled throughout a flight so that a specific separation between aircraft, both vertically and horizontally, is achieved. ATC is provided by either an Area Control Center (ACC) when the aircraft flies within a Flight Information Region (FIR), or by the Approach (APP) or Tower (TWR) units of a controlled airport upon takeoff or landing. In order for a flight to be controlled, voice communications between the pilot of the aircraft and the flight controller have to be continuously available and the aircraft has to be monitored via radar.

Very High Frequency (VHF) communications are achieved by a large number of earth-based VHF transceiver stations. The interconnection of the VHF transceivers with the ATC center is implemented using a ground communication networking infrastructure. At the ATC center, a radio PBX (e.g., the Voice Communication System, or VCS) handles the signals to and from the VHF transceiver sites and routes voice communications to flight controllers. The same PBX handles the interconnection with the airports, which have their own flight controllers.

In areas with mountainous terrains, it is extremely difficult, if not impossible, to provide the necessary communication infrastructure so that the remote VHF transceiver station can relay voice to and from the ATC center. This poses great threats to flight safety, often forcing the authorities to close parts of the airspace.

The use of satellite communications offers a viable alternative to VHF transceiver stations where it is not possible to use ground means to implement the communication infrastructure. However, though satellite communications offer exceptional geographical coverage, they also induce a large amount of transmission delay. For example, for geostationary trajectories, transmission delay is equal to approximately 260 milliseconds from one point to another, if a single hop is assumed. This delay poses important problems to aeronautical communications. For example, since the reaction time of pilots and controllers to difficult situations depends on the delay of the channel that they use to communicate, the minimum allowed separation depends on that delay. In addition, radio call control is adversely affected, because if ground communication means such as leased lines are used, the delay is in the order of some microseconds.

SUMMARY

Systems and methods for conveying aeronautical radio voice and signaling over a satellite IP network are described that overcome the disadvantages described above. According to one embodiment, a system for conveying aeronautical communications is described. The system comprises a very high frequency (VHF) transceiver installed at a remote site, a first radio-over-IP gateway connected to the VHF transceiver installed at the remote site, a first satellite router connected to the first radio-over-IP gateway installed at the remote site, a second satellite router installed at a central location, a second radio-over-IP gateway connected to the second satellite router installed at the central location, and a voice communication system (VCS) connected to the second radio-over-IP gateway installed at the central location.

According to another embodiment, a method for conveying aeronautical communications is described. The method comprises the steps of detecting push-to-talk (PTT) signaling from a first external radio system, relaying the PTT signaling to the first external radio system, capturing voice data from the first external radio system, encoding the voice data, storing the voice data in a first transmit buffer, and initiating a call setup sequence. If the call setup sequence is successful, the method further comprises the steps of transmitting the voice data to a second external radio system, decoding the voice data, and clearing the first transmit buffer. If the call setup sequence is unsuccessful, the method further comprises the step of clearing the first transmit buffer. According to another embodiment, a computer readable medium having computer executable instructions embedded thereon for performing the acts of this method is described.

DETAILED DESCRIPTION

A system and method for conveying aeronautical radio voice and signaling over a satellite IP network is described. In the following description, for purposes of explanation, numerous specific details are set forth in order to provide a thorough understanding of the exemplary embodiments. It is apparent to one skilled in the art, however, that embodiments can be practiced without these specific details or with an equivalent arrangement. In some instances, well-known structures and devices are shown in block diagram form in order to avoid unnecessarily obscuring the embodiments.

Figure 1:
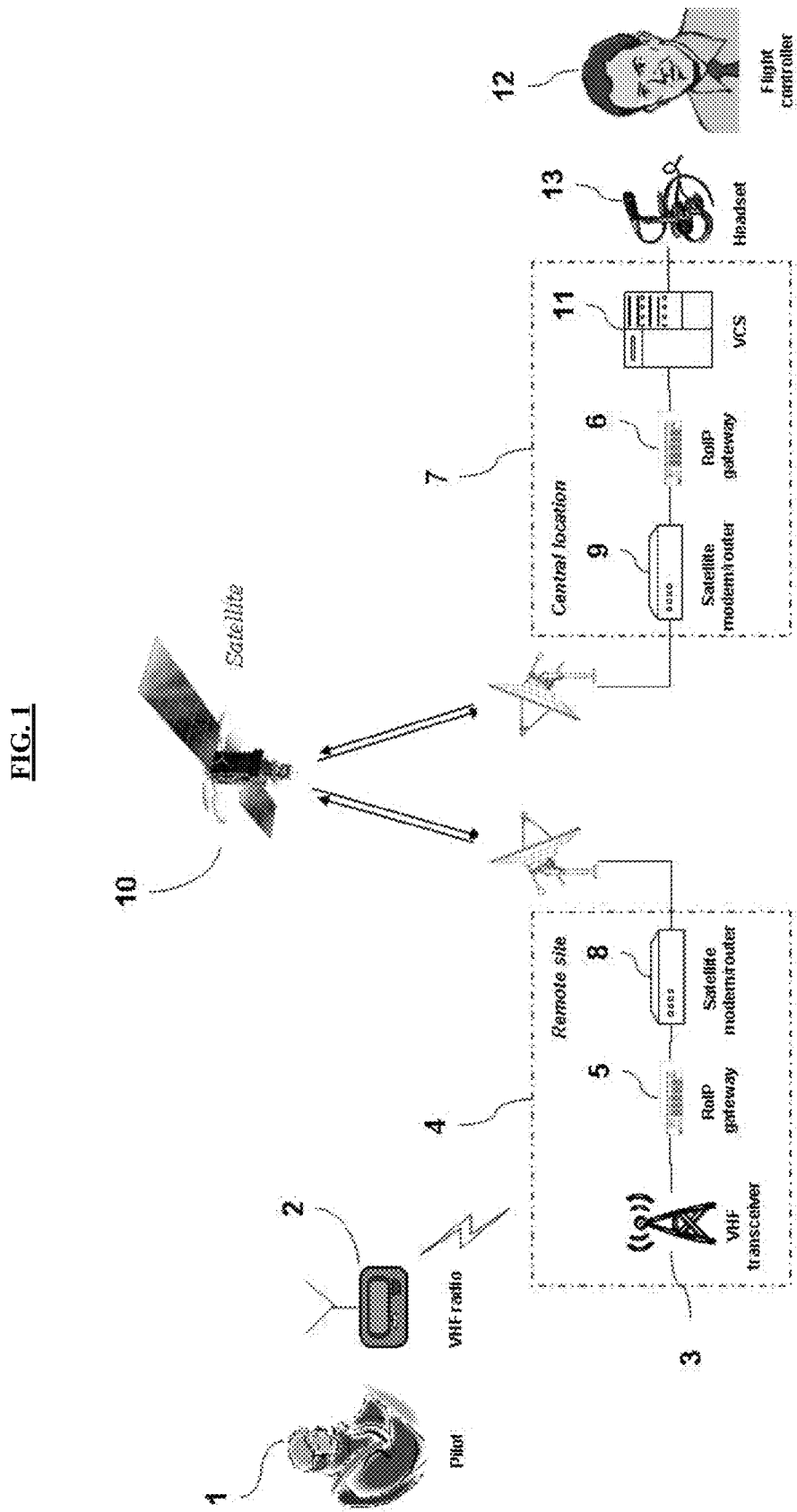
FIG. 1 is a block diagram illustrating a system for conveying aeronautical radio voice and signaling over a satellite IP network according to an embodiment.

Referring now to the drawings, wherein like reference numerals designate identical or corresponding parts throughout the several views, FIG. 1 is a block diagram illustrating a system for conveying aeronautical radio voice and signaling over a satellite IP network according to one embodiment. The end-to-end architecture of the system comprises a very high frequency (VHF) transceiver 3 (i.e., a radio system) installed at a remote site 4; a remote Radio-over-IP (RoIP) gateway 6 installed at a central location 7; and a voice communication system (VCS) 11 (i.e., a radio system).

According to one embodiment, a pilot 1 contacts a VHF transceiver 3 installed at a remote site 4 via and on-board VHF radio 2. The VHF transceiver 3 relays the voice and push-to-talk (PTT) signaling to the Radio-over-IP (RoIP) gateway 5, installed at the remote site 4, which then attempts to initiate a voice call with the RoIP gateway 6 installed at the central location 7. In doing so, the satellite IP modem/router 8, installed at the remote site 4, initiates an IP connection with the satellite IP modem/router 9, installed at the central location 7, through the satellite 10. Once the connection is successfully installed, voice and PTT signaling can be communicated from the VHF radio 2 onboard the aircraft to the RoIP gateway 6 installed at the central location 7. The RoIP gateway 6 then relays voice and PTT signaling to the VCS 11 and the controller 12 via the headset 13, so that the parties can communicate in a transparent manner. Although shown and described as a headset 13, it is contemplated that flight controller 12 can communicate with RoIP gateway 16 via any suitable transmitter, receiver or transceiver.

According to another embodiment, a controller 12 contacts the VCS 11 installed at the central location 7 via the headset 13. The VCS 11 relays the voice and PTT signaling to the Radio-over-IP (RoIP) gateway 6, installed at the central location 7, which then attempts to initiate a voice call with the RoIP gateway 5 installed at the remote site 4. In doing so, the satellite IP modem/router 9, installed at the central location 7, initiates an IP connection with the satellite IP modem/router 8, installed at the remote site 4, through the satellite 10. Once the connection is successfully installed, voice and PTT signaling can be communicated from the controller headset 13 to the RoIP gateway 5 installed at the remote site 4. RoIP gateway 5 then relays voice and PTT signaling to the VHF transceiver 3 which emits it. The on-board VHF radio 2 picks it up and relays it to the pilot 1, so that the parties can communicate in a transparent manner.

Figure 2:
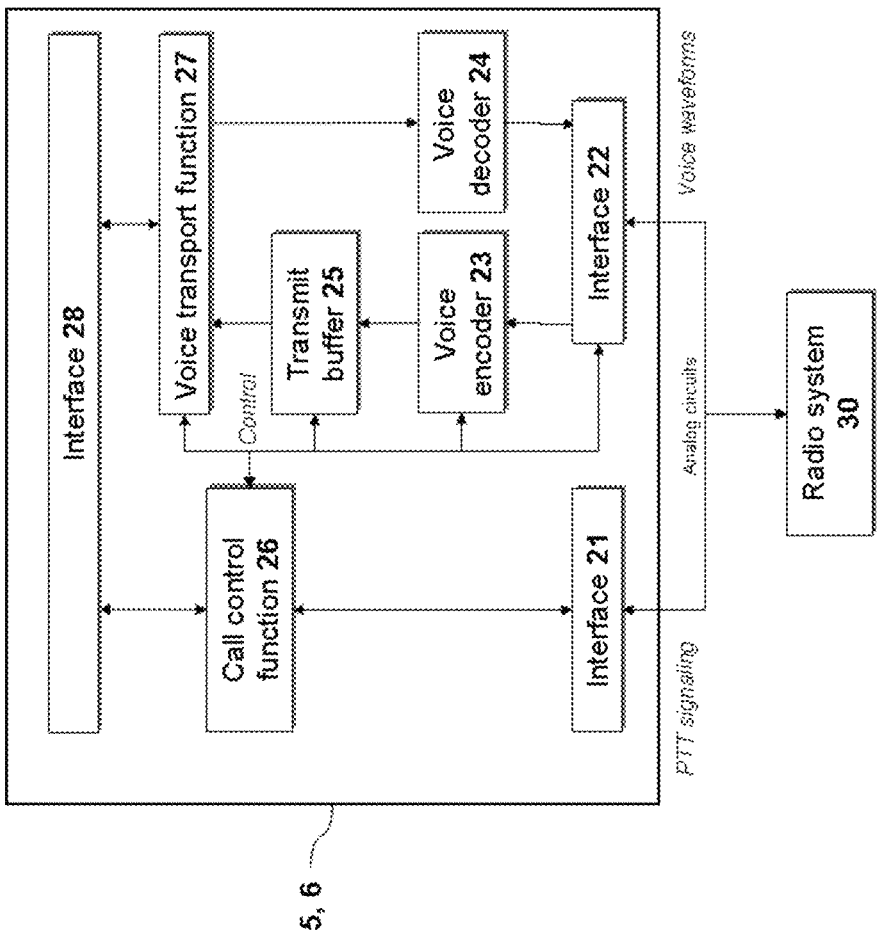
FIG. 2 is a block diagram illustrating the internal components of a Radio-over-IP (RoIP) gateway of a system for conveying aeronautical radio voice and signaling over a satellite IP network according to an embodiment.

FIG. 2 is a block diagram illustrating the internal components of RoIP gateways 5,6 of FIG. 1 according to one embodiment. In this embodiment, RoIP gateway 5 is identical to RoIP gateway 6. An interface 21 detects PTT signaling from an external radio system 30 which is conveyed over an analog circuit, and relays PTT signaling to an external radio system 30 over another analog circuit. An interface 22 captures voice waveforms from an external radio system 30 through an analog circuit under the control of the call control function 26, and plays back voice waveforms to an external radio system 30 through another analog circuit.

A voice encoder 23 compresses voice to reduce its bit rate under the control of the call control function 26. A voice decoder 24 decompresses the voice to its original bit rate. A transmit buffer 25, under the control of the call control function 26, stores the voice until a call has been setup so that no information is discarded. The call control function 26 sets up and tears down voice calls between two RoIP gateways. A voice transport function 27 encapsulates compressed voice data which are output by the transmit buffer 25 on IP packets and decapsulates compressed voice data contained in IP packets which are output to the voice decoder 24 under the control of the call control function 26. The call control function 26 and the voice transport function 27 of a RoIP gateway communicate with the respective entities within another RoIP gateway using interface 28.

Figure 3:
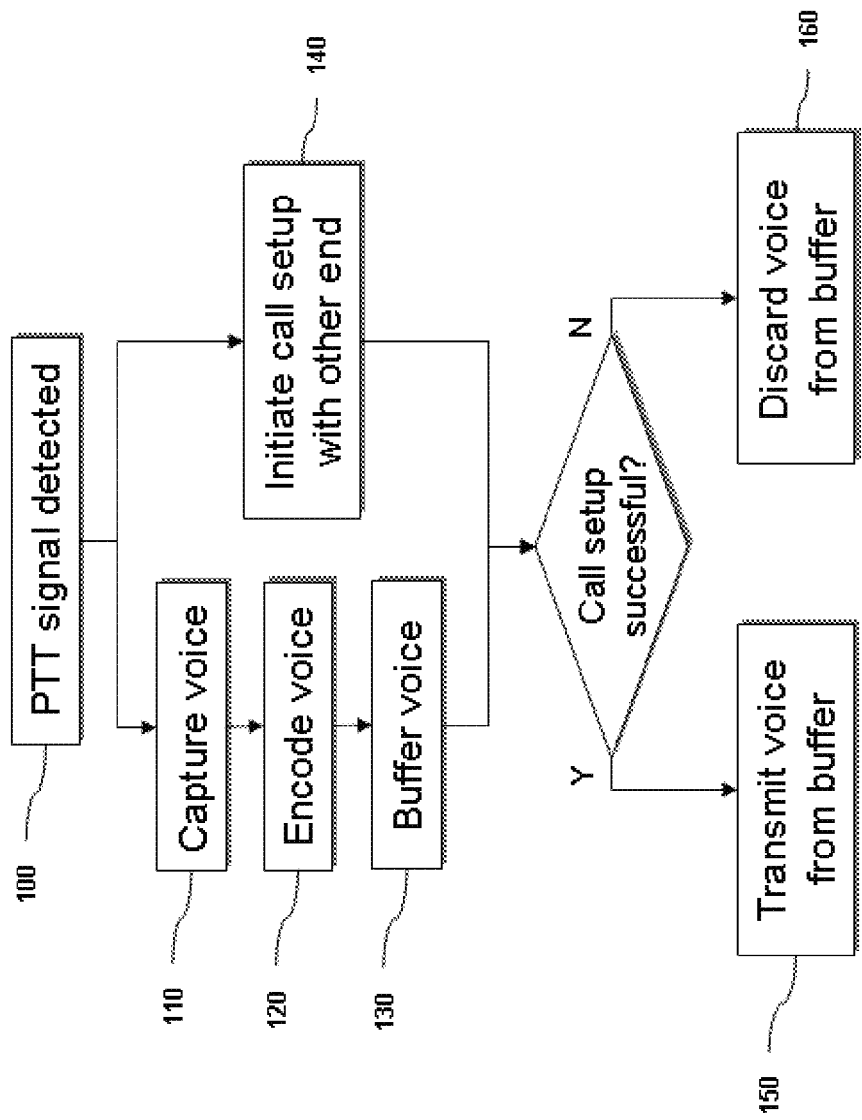
FIG. 3 is a flow chart illustrating a method for conveying aeronautical radio voice over a satellite IP network according to an embodiment.

FIG. 3 is a flow chart illustrating a method for conveying aeronautical radio voice over a satellite IP network according to one embodiment. At step 100, a PTT signal is detected from the radio system of the user who wishes to initiate a call, provided that no call was already ongoing. This may be either the pilot 1 (through the on-board VHF radio 2 and the VHF transceiver 3), or the controller 12 (through the headset 13 and the VCS 11). This signal is detected through interface 21.

At step 110, the RoIP gateway which has received the PTT signal (either RoIP gateway 5 or 6) starts digitizing the voice through interface 22. At step 120, the same RoIP gateway (either RoIP gateway 5 or 6) starts encoding the voice signal for transmission using the voice encoder 23. At step 130, the voice signal is stored within the transmit buffer 25. At step 140, a call setup sequence is started with the called communication end (either RoIP gateway 5 or 6) using the call control function 26 through interface 28. Each of steps 100 to 140 may occur subsequently to or concurrently with one another.

If the call setup at step 140 is successful, the calling RoIP gateway (either RoIP gateway 5 or 6) starts transmitting the buffered voice using the voice transport function through interface 28 at step 150. If the call setup is unsuccessful, the stored voice is discarded according to step 160.

If the transmit buffer remained operational throughout the duration of the call, the end-to-end delay would include the call setup delay. Thus, it is necessary to remove the transmit buffer 25 at a suitable point in time without losing valuable voice information by doing so. Because radio communications are inherently half-duplex, this can be done during the period that the calling end (either VHF radio 2 or headset 13) does not transmit voice, but rather listens to the transmissions of the called end (the other of VHF radio 2 or headset 13).

Figure 4:
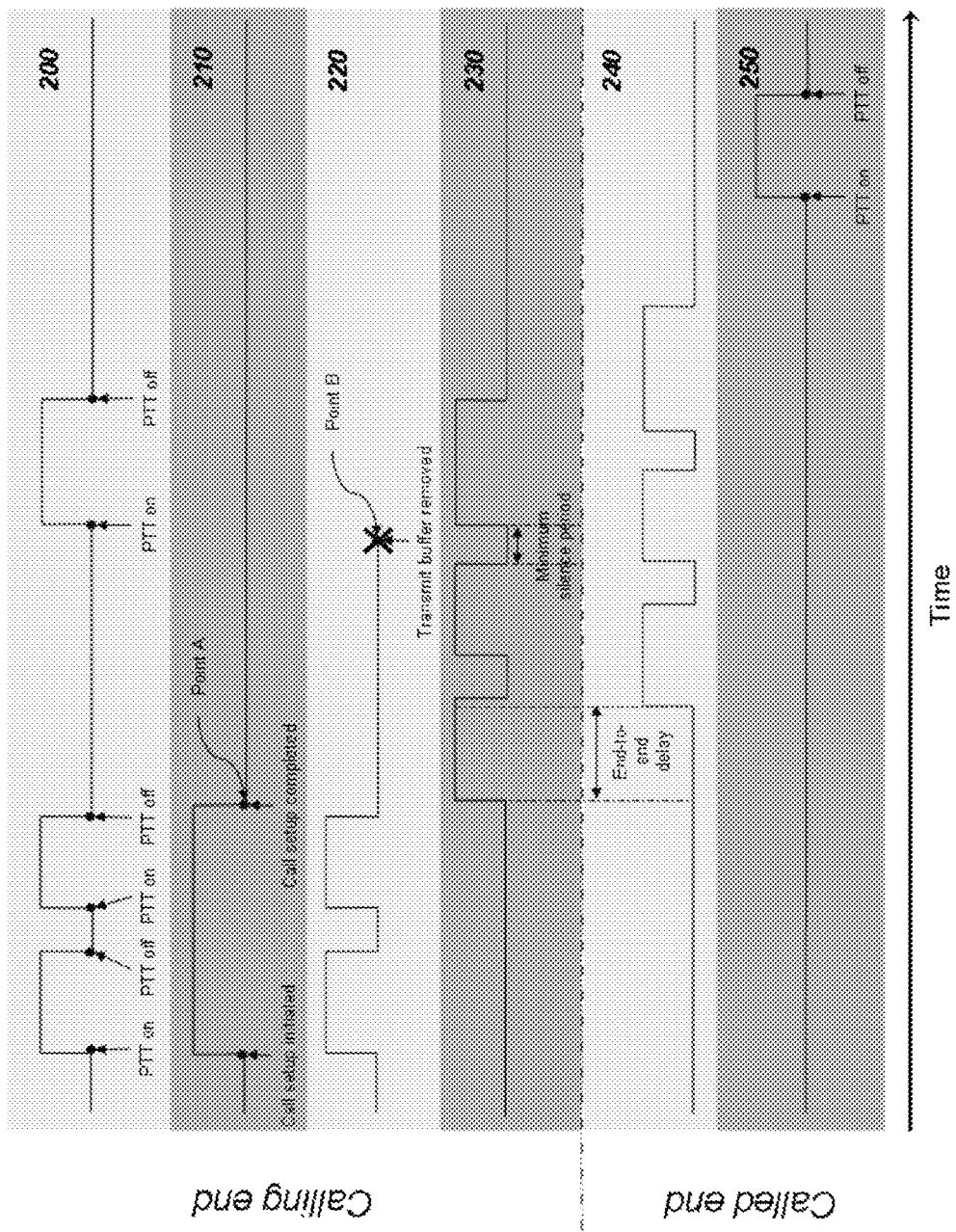
FIG. 4 is a sequence diagram illustrating a method of reducing end-to-end delay after successful call setup according to an embodiment.

FIG. 4 illustrates a method of reducing the end-to-end delay once the call setup has been successfully completed according to an embodiment. Signal 200 depicts the sequence of PTT signals (on/off) issued by the calling end, assuming that a call was not already ongoing. Signal 210 depicts the initiation and successful completion of the call setup sequence triggered by the first PTT signal of signal 200. Signal 220 depicts the contents of the transmit buffer 25 and the point in time when it is removed from the end-to-end path. Signal 230 depicts the voice transmitted from the calling end to the called end via interface 28, while signal 240 depicts the voice as received by the called end after the addition of the end-to-end delay that the whole system introduces. As compared to signal 200, it is apparent that a period of silence has been removed so as to also remove the transmit buffer 25. Signal 250 presents the response of the called end after having heard the calling end.

According to the method of FIG. 4, no new voice data are inserted in the transmit buffer 25 when (a) the call setup has been successfully completed (i.e., at point A of FIG. 4), (b) the value of the PTT signal is 0 (no PTT is present, i.e., neither pilot 1 nor controller 12 wish to talk), and (c) a minimum silence period (i.e., period of time when PTT=0) is maintained between successive transmissions from the calling end, so as for the called end to be capable of discerning the individual transmissions.

When all of the contents of the buffer have been transmitted (i.e., at point B of FIG. 4), the transmit buffer 25 is removed and no new voice data are inserted for the duration of the call. This removes the delay of the call setup from the end-to-end delay as is apparent from FIG. 4.

Figure 5:
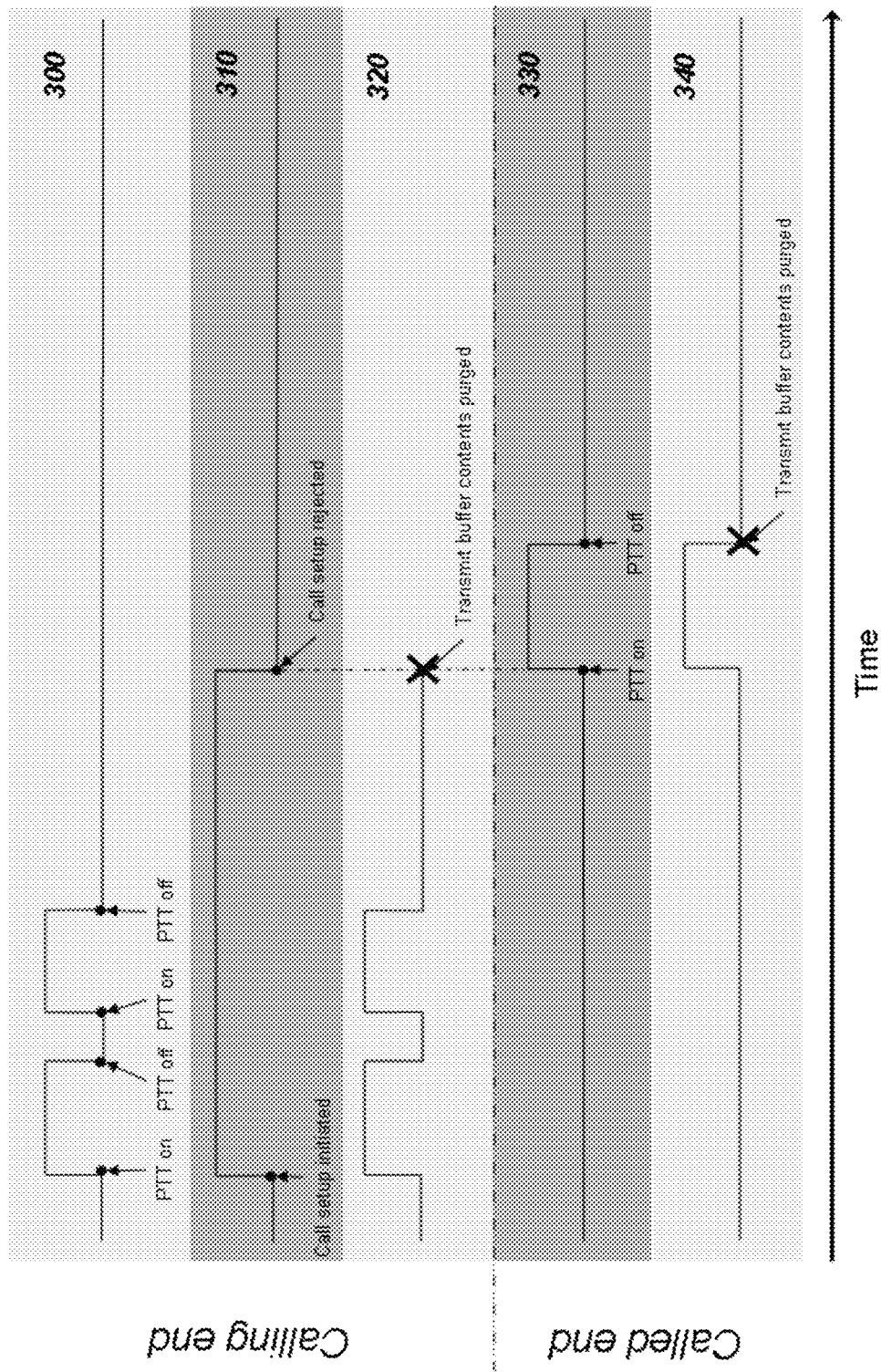
FIG. 5 is a sequence diagram illustrating a method of terminating an ongoing call step sequence as unsuccessful according to an embodiment.

FIG. 5 illustrates a method for terminating an ongoing call setup sequence as unsuccessful according to an embodiment. In this embodiment, the calling end (either RoIP gateway 5 or 6) initiates the call setup through PTT signaling (signal 300), but during the call setup sequence with the called end (signal 310), the called end also attempts to contact the calling end (signal 330). In this case, the voice is discarded from the transmit buffers 25 of both ends (signals 320 and 340), and the pilot 1 and/or controller 12 have to try again.

Figure 6:
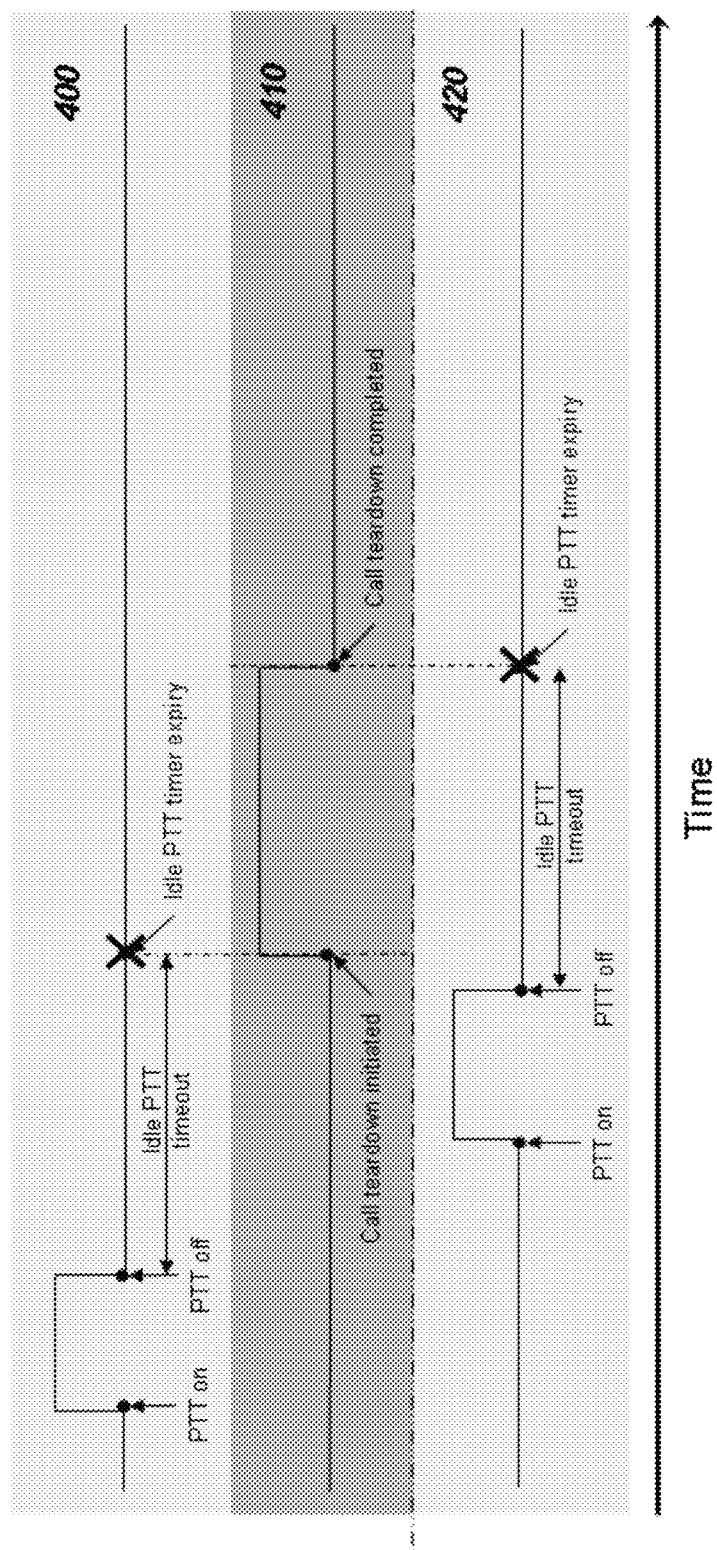
FIG. 6 is a sequence diagram illustrating a method of successfully tearing down an existing voice call according to an embodiment.

FIG. 6 illustrates a method for tearing down an existing call according to an embodiment. According to signal 400, the length of the time periods for which a PTT signal is not active is measured by an idle PTT timer, renewed each time the PTT is on, and if it exceeds a certain limit (i.e., the idle PTT timeout), a call teardown sequence is initiated by the communication end which has detected this condition. Each end can initiate one such sequence. When the other end also reaches the same state (signal 420), the call is terminated according to signal 410.

Figure 7:
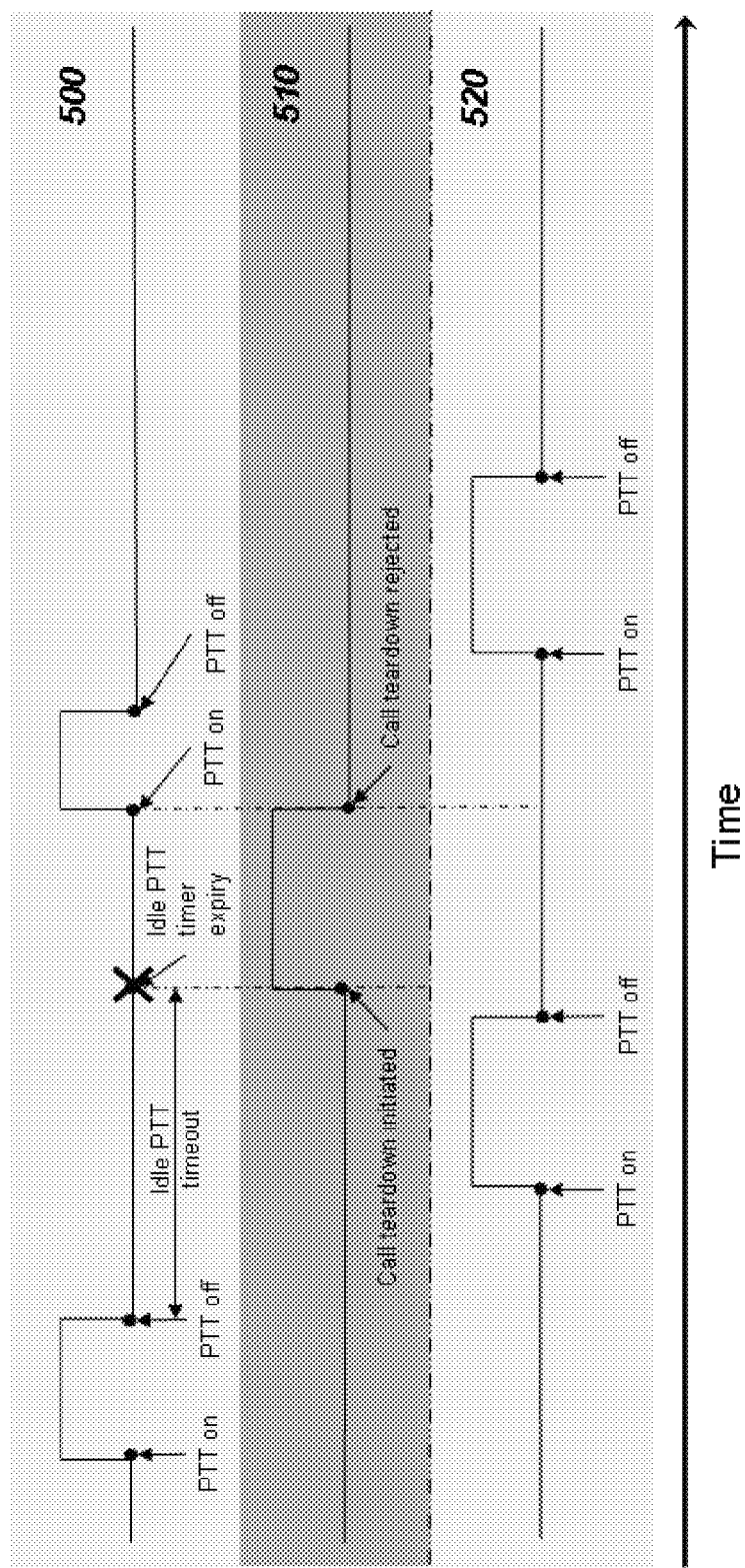
FIG. 7 is a sequence diagram illustrating a method of aborting a call teardown sequence of an existing voice call when the communication end that has initiated the call teardown sequence decides to transmit in accordance with an embodiment.

If the user at either end issues a PTT during the call teardown sequence, the call teardown is aborted and the call is kept in an ongoing state. FIG. 7 illustrates the situation in which the user at the end which has initiated the call teardown is the one who wishes to talk (signal 500). According to FIG. 7, the call teardown is rejected according to signal 510 without any additional actions on behalf of the RoIP gateways 5 and 6. Signal 520 represents the PTT signaling of the user at the other end.

Figure 8:
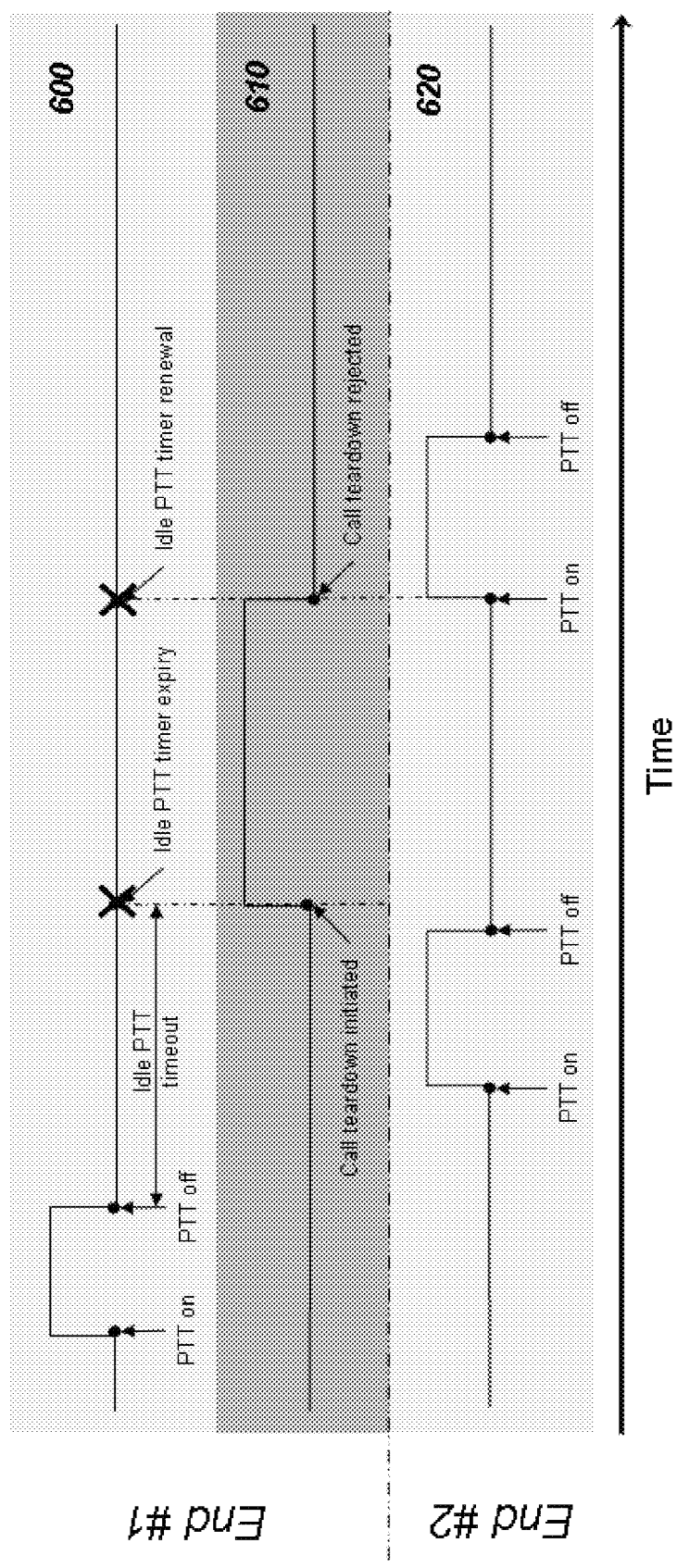
FIG. 8 is a sequence diagram illustrating a method of aborting a call teardown sequence of an existing voice call when the communication end that has not initiated the call teardown sequence decides to transmit in accordance with an embodiment.

FIG. 8 illustrates the situation in which the user at the other end presses the PTT button (signal 620). In this situation, the call teardown is also rejected (signal 610) and the PTT idle timer of the other end is re-initialized (signal 600).

Figure 9:
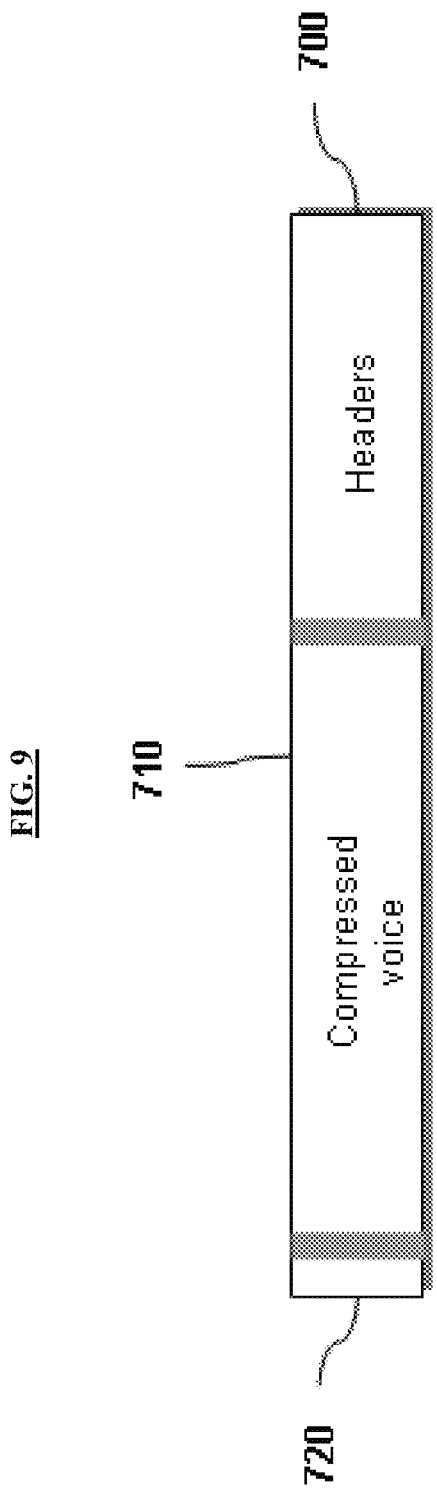
FIG. 9 is a schematic illustrating the structure of a packet for conveying a segment of voice in synchrony with a push-to-talk (PTT) signal that applies to that segment in accordance with an embodiment.

The above described embodiments illustrate the importance of conveying the PTT signal in synchrony with the voice data. If the PTT signal is not conveyed in synchrony with the voice data, voice could be lost, which is unacceptable in aeronautical communications. FIG. 9 illustrates a method of transmitting PTT signaling together with voice data so as to avoid loss of voice data according to an embodiment. The voice is transmitted in segments 710, encapsulated into IP packets with the proper headers 700. The encapsulation is carried out by the voice transport function 27 presented in FIG. 2. For each packet presented in FIG. 9, the PTT signal is provided by the call control function 26 and encoded using a separate bit 720. Because each voice packet covers a specific time period while the PTT signal can vary within that period, this bit is set to 1 when the original PTT signal, captured through interface 21, is 1 even for the minimum timing resolution of the interface. This is the safest approach, because the loss of voice data is set to zero.

Figure 10:
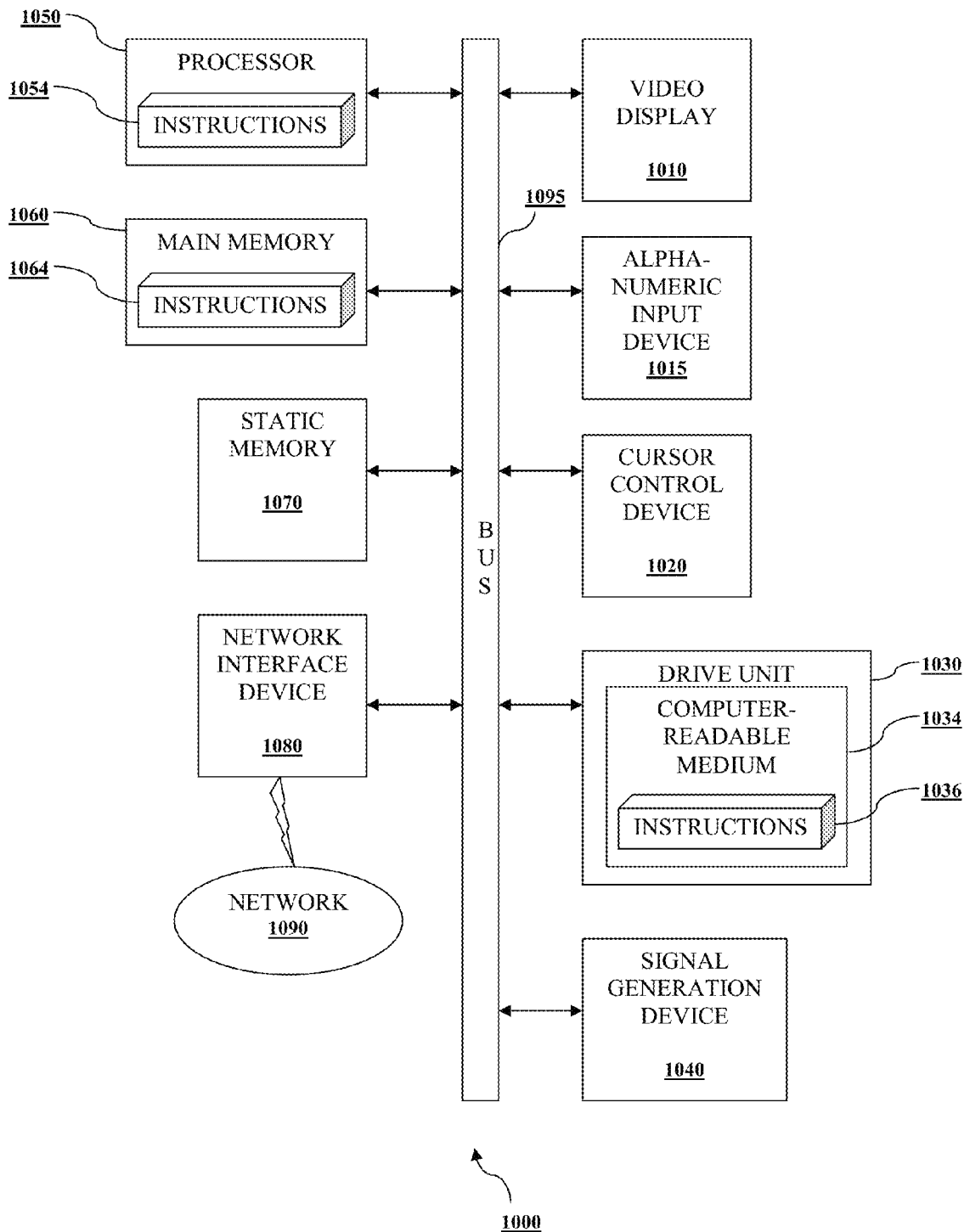
FIG. 10 is a diagrammatic representation of machine in the exemplary form of computer system within which a set of instructions causes the machine to perform any one or more of the methodologies discussed herein in accordance with an embodiment.

FIG. 10 shows a diagrammatic representation of machine in the exemplary form of computer system 1000 within which a set of instructions, for causing the machine to perform any one or more of the methodologies discussed herein, may be executed. For example, computer system 1000 may represent RoIP gateways 5 and/or 6. In alternative embodiments, the machine operates as a standalone device or may be connected (e.g., networked) to other machines. In a networked deployment, the machine may operate in the capacity of a server or a client machine in server-client network environment, as a host machine, or as a peer machine in a peer-to-peer (or distributed) network environment. The machine may be a personal computer (PC), a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

According to some embodiments, computer system 1000 comprises processor 1050 (e.g., a central processing unit (CPU), a graphics processing unit (GPU) or both), main memory 1060 (e.g., read only memory (ROM), flash memory, dynamic random access memory (DRAM) such as synchronous DRAM (SDRAM) or Rambus DRAM (RDRAM), etc.) and/or static memory 1070 (e.g., flash memory, static random access memory (SRAM), etc.), which communicate with each other via bus 1095.

According to some embodiments, computer system 1000 may further comprise video display unit 1010 (e.g., a liquid crystal display (LCD), a light-emitting diode display (LED), an electroluminescent display (ELD), plasma display panels (PDP), an organic light-emitting diode display (OLED), a surface-conduction electron-emitted display (SED), a nanocrystal display, a 3D display, or a cathode ray tube (CRT)). According to some embodiments, computer system 1000 also may comprise alphanumeric input device 1015 (e.g., a keyboard), cursor control device 1020 (e.g., a controller or mouse), disk drive unit 1030, signal generation device 1040 (e.g., a speaker), and/or network interface device 1080. In still other embodiments, video display unit 1010, alphanumeric input device 1015 (e.g., a keyboard), cursor control device 1020 (e.g., a controller or mouse), disk drive unit 1030, signal generation device 1040 (e.g., a speaker), and/or network interface device 1080 are optional.

Disk drive unit 1030 includes computer-readable medium 1034 on which is stored one or more sets of instructions (e.g., software 1036) embodying any one or more of the methodologies or functions described herein. Software 1036 may also reside, completely or at least partially, within main memory 1060 and/or within processor 1050 during execution thereof by computer system 1000, main memory 1060 and processor 1050. Processor 1050 and main memory 1060 can also constitute computer-readable media having instructions 1054 and 1064, respectively. Software 1036 may further be transmitted or received over network 1090 via network interface device 1080.

While computer-readable medium 1034 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the disclosed embodiments. The term "computer-readable medium" shall accordingly be taken to include, but not be limited to, solid-state memories, and optical and magnetic media.

It should be understood that processes and techniques described herein are not inherently related to any particular apparatus and may be implemented by any suitable combination of components or modules. Further, various types of general purpose devices may be used in accordance with the teachings described herein. It may also prove advantageous to construct a specialized apparatus to perform the methods described herein. Those skilled in the art will appreciate that many different combinations of hardware, software, and firmware will be suitable for practicing the disclosed embodiments.

Embodiments have been described in relation to particular examples, which are intended in all respects to be illustrative rather than restrictive. Further, while embodiments have been described in connection with a number of examples and implementations, it is understood that various modifications and equivalent arrangements can be made to the examples while remaining within the scope of the inventive embodiments.

Other embodiments will be apparent to those skilled in the art from consideration of the specification and practice of the embodiments disclosed herein. Various aspects and/or components of the described embodiments may be used singly or in any combination. It is intended that the specification and examples be considered as exemplary only, with a true scope and spirit of the disclosure being indicated by the following claims.

What is claimed is:

1. A method of conveying aeronautical communications, the method comprising:
    detecting push-to-talk (PTT) signaling from a first external radio system;
    relaying the PTT signaling to the first external radio system;
    capturing voice data from the first external radio system;
    encoding the voice data;
    storing the voice data in a first transmit buffer;
    initiating a call setup sequence;
    if the call setup sequence is successful:
    transmitting the voice data to a second external radio system,
    decoding the voice data, and
    clearing the first transmit buffer; and
    if the call setup sequence is unsuccessful:
        clearing the first transmit buffer, the method further comprising,
    if the call setup sequence is successful:
        reducing end-to-end delay between the first external radio system and the second external radio system.

2. The method of claim 1, wherein the step of reducing end-to-end delay comprises:
    preventing new voice data from entering the transmit buffer if:
        (a) the call setup sequence is successful,
        (b) no PTT signaling is present, and
        (c) no PTT signaling has been present for a minimum silence period; and
    removing the first transmit buffer if it is empty.

3. A method of conveying aeronautical communications, the method comprising:
    detecting push-to-talk (PTT) signaling from a first external radio system;
    relaying the PTT signaling to the first external radio system;
    capturing voice data from the first external radio system;
    encoding the voice data;
    storing the voice data in a firs t transmit buffer;
    initiating a call setup sequence;
    if the call setup sequence is successful:
    transmitting the voice data to a second external radio system,
    decoding the voice data, and
    clearing the first transmit buffer; and
    if the call setup sequence is unsuccessful:
        clearing the first transmit buffer, the method further comprising, if the call setup sequence is successful:
    detecting PTT signaling from the second external radio system;
    relaying the PTT signaling to the second external radio system;
    capturing voice data from the second external radio system;
    encoding the voice data
    storing the voice data in a second transmit buffer;
    transmitting the voice data;
    decoding the voice data; and
    clearing the second transmit buffer
    wherein, if voice data is simultaneously stored in the first transmit buffer and the second transmit buffer, clearing the first transmit buffer and the second transmit buffer.

4. A method of conveying aeronautical communications, the method comprising:
    detecting push-to-talk (PTT) signaling from a first external radio system;
    relaying the PTT signaling to the first external radio system;
    capturing voice data from the first external radio system;
    encoding the voice data;
    storing the voice data in a firs t transmit buffer;
    initiating a call setup sequence;
    if the call setup sequence is successful:
    transmitting the voice data to a second external radio system,
    decoding the voice data, and
    clearing the first transmit buffer; and
    if the call setup sequence is unsuccessful:
        clearing the first transmit buffer, the method further comprising, if the call setup sequence is successful:
    detecting PTT signaling from the second external radio system;
    relaying the PTT signaling to the second external radio system;
    capturing voice data from the second external radio system;
    encoding the voice data
    storing the voice data in a second transmit buffer;
    transmitting the voice data;
    decoding the voice data; and
    clearing the second transmit buffer the method further comprising:
    staring a timer each time PTT signaling is detected from the first external radio system or the second external radio system; and
    of the timer exceeds a minimum silence period, initiating a call teardown sequence.

5. The method of claim 4, further comprising:
    aborting the call teardown sequence if PTT signaling is detected from the first external radio system or the second external radio system.

6. A non-transitory computer readable medium having computer executable instructions embedded thereon for performing the steps of:
    detecting push-to-talk (PTT) signaling from a first external radio system;
    relaying the PTT signaling to the first external radio system;

capturing voice data from the first external radio system;
encoding the voice data;
storing the voice data in a first transmit buffer;
initiating a call setup sequence;
if the call setup sequence is successful:
   transmitting the voice data to a second external radio system,
   decoding the voice data,
   clearing the first transmit buffer, and
   reducing end-to end delay between the first external radio system and the second external radio system; and
if the call setup sequence is unsuccessful:
   clearing the first transmit buffer.

\* \* \* \* \*